(12) United States Patent
Zernickel

(10) Patent No.: US 6,170,351 B1
(45) Date of Patent: Jan. 9, 2001

(54) DEVICE FOR CONVERTING A ROTATIONAL MOVEMENT INTO AN AXIAL MOVEMENT

(75) Inventor: Alexander Zernickel, Herzogenaurach (DE)

(73) Assignee: Ina Walzlager Schaeffler oHG (DE)

(*) Notice: Under 35 U.S.C. 154(b), the term of this patent shall be extended for 0 days.

(21) Appl. No.: 09/284,429
(22) PCT Filed: Sep. 15, 1997
(86) PCT No.: PCT/EP97/05026
  § 371 Date: Apr. 12, 1999
  § 102(e) Date: Apr. 12, 1999
(87) PCT Pub. No.: WO98/21506
  PCT Pub. Date: May 22, 1998

(30) Foreign Application Priority Data
Nov. 9, 1996 (DE) .............................. 196 46 339

(51) Int. Cl.[7] .................................................. F16H 25/22
(52) U.S. Cl. ...................... 74/459; 74/89.15; 74/424.8 R
(58) Field of Search ................ 74/89.15, 424.8 R, 74/459

(56) References Cited

U.S. PATENT DOCUMENTS

| | | |
|---|---|---|
| 3,884,090 | 5/1975 | Dock . |
| 4,993,849 * | 2/1991 | Radinger et al. ................ 384/447 |
| 5,370,012 * | 12/1994 | Stanley ........................... 74/89.15 |
| 5,836,208 * | 11/1998 | Dietrich et al. ............... 74/424.8 C |
| 6,026,696 * | 2/2000 | Hehl ................................. 74/89.15 |

FOREIGN PATENT DOCUMENTS

| | | |
|---|---|---|
| 410542 | 10/1966 | (CH) . |
| 665459 | 5/1988 | (CH) . |
| 2150739 | 4/1972 | (DE) . |
| 4131486 | 3/1993 | (DE) . |
| 0603067 | 6/1994 | (EP) . |

* cited by examiner

Primary Examiner—David Fenstermacher
(74) Attorney, Agent, or Firm—Bierman, Muserlian and Lucas

(57) ABSTRACT

A device for converting a rotary motion into an axial motion has a threaded spindle (1), a nut concentrically surrounding the threaded spindle with a clearance and a plurality of axially parallel rollers (2) guided in a cage (6) and arranged in the clearance, said rollers (2) have a circumferential profile by which they mesh with the external thread of the threaded spindle (1) and with the corresponding internal thread of the nut. Each of these rollers (2) is axially displaceable within the cage (6) by the dimension of the thread pitch during a rotation of the nut relative to the threaded spindle (1), while at the end of such a rotation, each roller (2) is re-displaceable within an axial groove (7) of the nut into the starting position by a cam (8, 12) arranged in the vicinity of each end face of the cage (6). According to the invention, the nut is a thin-walled sheet metal sleeve (3) made by non-chipping shaping. In this way, a device with a simpler structure and more economic to manufacture is obtained.

8 Claims, 1 Drawing Sheet

DEVICE FOR CONVERTING A ROTATIONAL MOVEMENT INTO AN AXIAL MOVEMENT

FIELD OF THE INVENTION

The invention concerns a device for converting a rotary motion into an axial motion, which device has a threaded spindle, a nut concentrically surrounding the threaded spindle with a clearance and a plurality of axially parallel rollers guided in a cage and arranged in the clearance, said rollers have a circumferential profile by which they mesh with the external thread of the threaded spindle and with the corresponding internal thread of the nut, each of said rollers is axially displaceable within the cage by the dimension of the thread pitch during a rotation of the nut relative to the threaded spindle, while at the end of such a rotation, each roller is re-displaceable within an axial groove of the nut into the starting position by a cam arranged in the vicinity of each end face of the cage.

BACKGROUND OF THE INVENTION

Such roller screw drives for converting a rotational motion into a translational motion are used mainly in cases in which, for operational reasons, no high precision of pitch and position is required but rather, an economic solution with a high degree of efficiency and good bearing capacity. Such a roller screw drive is known from DE-OS 21 50 739. This drive comprises a solid nut body and two likewise solid annular cam members which mesh by regions having annular cam surfaces with annular end recesses of a cage for the rollers. The manufacturing of this device is highly complicated so that the resulting construction is very expensive.

SUMMARY OF THE INVENTION

The object of the invention is to create a roller screw drive which has a simpler structure and is more economic to manufacture.

The invention achieves this object by the fact that the nut is a thin-walled sheet metal sleeve made by non-chipping shaping which is pressed into a bore of the housing which receives the device. This permits a considerable reduction of material so that the device also has a lesser weight. Due to being pressed in, the thin-walled sheet metal sleeve receives its precision of shape and dimension.

The sheet metal sleeve can be drawn from a circular blank. During the drawing process, the axial groove for the return displacement of the rollers can be formed at the same time. The internal thread of the sheet metal sleeve can be made by roller-burnishing.

It is, however, also possible to make the sheet metal sleeve by bending out of a sheet metal strip on which an internal thread has previously been made by rolling, and then welding the thus formed sleeve along the abutting edges. One of the cams for the return displacement of the rollers can be formed on a flange of the sheet metal sleeve and a further cam for the return displacement of the rollers can be configured on a disc inserted into and fixed in the sheet metal sleeve. A disc profiled by non-chipping shaping is suitable for this purpose. By bending over an adjacent rim of the sheet metal sleeve, the disc can be axially fixed in the sheet metal sleeve. It is also possible to fix the disc axially in the sheet metal sleeve by swaging the material of the disc and/or the material of the sleeve.

The thread of the spindle and the groove profile of the rollers can also be made by roller-burnishing.

By the pressing-in of the device into the bore of the housing, the required radial clearance and pre-tension of the roller screw drive is obtained. If necessary, a selective matching of rollers and spindles can be carried out.

BRIEF DESCRIPTION OF THE DRAWINGS

An example of embodiment of the invention is represented in the drawings and will be described more closely in the following. The figures show.

DETAILED DESCRIPTION OF THE DRAWINGS

Figure 1:
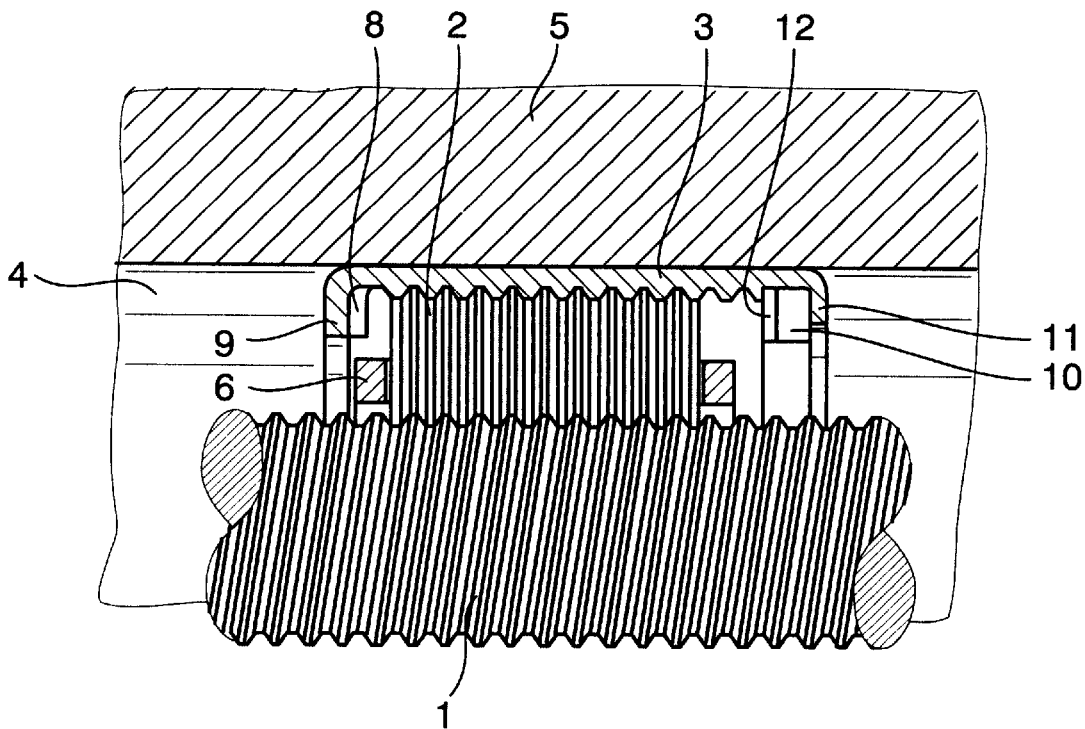
FIG. 1, a partial representation of a device of the invention pressed into the bore of a housing, in an axial section.
Figure 2:
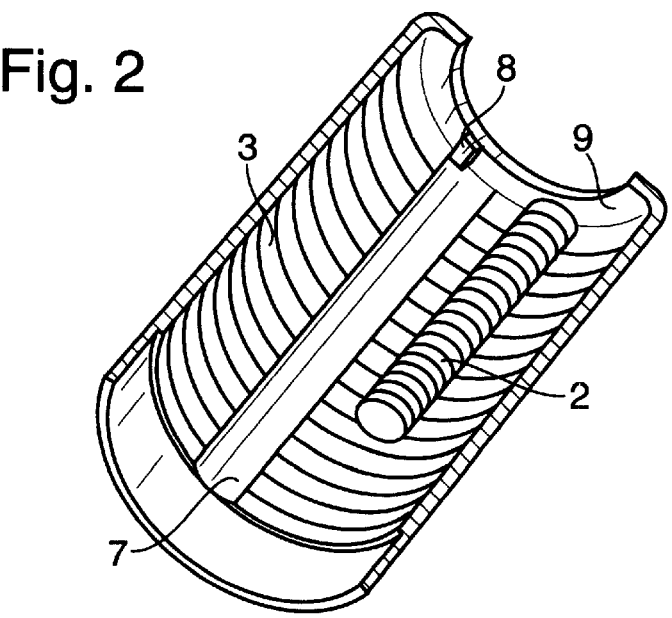
FIG. 2, a partial perspective view of a sheet metal sleeve of the device of the invention with an inserted roller.

A device of the invention for converting a rotary motion into an axial motion comprises a threaded spindle 1 surrounded on its outer peripheral surface by a plurality of rollers 2 spaced behind one another. The rollers 2 are arranged axially parallel to the threaded spindle 1 and comprise a profile by which they mesh both with the external thread of the threaded spindle 1 and with the internal thread of a nut which is arranged concentric to the threaded spindle 1 and surrounds this with a clearance corresponding to the rollers 2.

According to the invention, this nut is configured as a sheet metal sleeve 3 made by non-chipping shaping. The internal thread of this sleeve 3 can be made by roller-burnishing. The sleeve 3 is pressed into a bore 4 of a housing 5 which can be a component to be displaced in the axial direction of the threaded spindle 1. This pressing-in gives the sheet metal sleeve 3 its precision of shape and dimension.

The rollers 2 which surround the threaded spindle 1 are guided within the sheet metal sleeve 3 in a cage 6. When the threaded spindle 1 rotates, the rollers 2 execute a planetary motion about the threaded spindle 1 within the sheet metal sleeve 3 and move at the same time in their recesses in the cage 6 in an axial direction in keeping with the pitch of the thread of the threaded spindle 1. After a complete rotation of the threaded spindle 1, each roller 2 has moved in axial direction by the dimension of the thread pitch of the threaded spindle 1 and has to be returned to its starting position. For this purpose, the sheet metal sleeve 3 comprises an axially parallel groove 7 into which the roller 2 comes to be situated after the rotation. In this position, the roller 2 no longer meshes with the threaded spindle 1 and is returned by a cam fixed in the sheet metal sleeve 3 to its starting position to then come to mesh anew with the threaded spindle 1 during the next rotation thereof.

Such a cam 8 is formed on a flange 9 of the sheet metal sleeve 3 in the vicinity of one end of the cage 6. A disc 10 is inserted into the sheet metal sleeve 3 in the vicinity of the other end of the cage 6, and after the flange 11 provided in this region has been bent over, the disc 10 is fixed in the sheet metal sleeve 3. This disc 10 comprises the second cam 12 of the device. Depending on the direction of rotation of the threaded spindle 1, either the first cam 8 or the second cam 12 acts on the roller 2 to return it into its starting position.

What is claimed is:

1. A device for converting a rotary motion into an axial motion, which device has a threaded spindle (1), a nut concentrically surrounding the threaded spindle with a clearance and a plurality of axially parallel rollers (2) guided in a cage (6) and arranged in the clearance, said rollers (2) have a circumferential profile by which they mesh with the external thread of the threaded spindle (1) and with the corresponding internal thread of the nut, each of said rollers (2) is axially displaceable within the cage (6) by the dimension of the thread pitch during a rotation of the nut relative to the threaded spindle (1), while at the end of such a rotation, each roller (2) is re-displaceable within an axial groove (7) of the nut into the starting position by a cam (8, 12) arranged in the vicinity of each end face of the cage (6) characterized in that the nut is a thin-walled sheet metal sleeve (3) which is made by non-chipping shaping and is pressed into a bore (4) of a housing (5) which receives the device.

2. A device according to claim 1, characterized in that the sheet metal sleeve (3) is drawn from a circular blank, and the axial groove (7) for the return displacement of the rollers (2) is simultaneously formed during the drawing process.

3. A device according to claim 1, characterized in that the internal thread of the sheet metal sleeve (3) is made by roller-burnishing.

4. A device according to claim 1, characterized in that the sheet metal sleeve (3) is bent from a sheet metal strip on which the internal thread is made by rolling, and abutting ends of the sheet metal strip thus obtained are welded together.

5. A device according to claim 1, characterized in that one of the cams (8, 12) for the return displacement of the rollers (2) is formed on a flange (9) of the sheet metal sleeve (3).

6. A device according to claim 1, characterized in that one of the cams (8, 12) for the return displacement of the rollers (2) is formed on a disc (10) which is inserted into and fixed in the sheet metal sleeve (3).

7. A device according to claim 6, characterized in that the disc (10) is axially fixed in the sheet metal sleeve (3) by bending over an adjacent flange (11) of the sheet metal sleeve (3).

8. A device according to claim 6, characterized in that the disc (10) is axially fixed in the sheet metal sleeve (3) by swaging the material of the disc (10) and/or the material of the sheet metal sleeve (3).

\* \* \* \* \*